(No Model.) 2 Sheets—Sheet 1.

J. R. WITZEL.
WEIGHING SCALE.

No. 530,980. Patented Dec. 18, 1894.

WITNESSES:

INVENTOR
Joseph R. Witzel
BY
ATTORNEY.

(No Model.) 2 Sheets—Sheet 2.

J. R. WITZEL.
WEIGHING SCALE.

No. 530,980. Patented Dec. 18, 1894.

WITNESSES:

INVENTOR
Joseph R. Witzel
BY
ATTORNEY.

UNITED STATES PATENT OFFICE.

JOSEPH R. WITZEL, OF PHILADELPHIA, PENNSYLVANIA.

WEIGHING-SCALE.

SPECIFICATION forming part of Letters Patent No. 530,980, dated December 18, 1894.

Application filed October 11, 1893. Serial No. 487,827. (No model.)

*To all whom it may concern:*

Be it known that I, JOSEPH R. WITZEL, a citizen of the United States, residing in the city and county of Philadelphia, State of Pennsylvania, have invented a new and useful Improvement in Weighing-Scales, which improvement is fully set forth in the following specification and accompanying drawings.

My invention consists of an improved scale adapted for accurate and delicate weighing, the same being formed of a rotary graduated disk having a pan secured thereto.

It also consists of novel suspension devices for the disk or beam of a scale.

Figure 1:
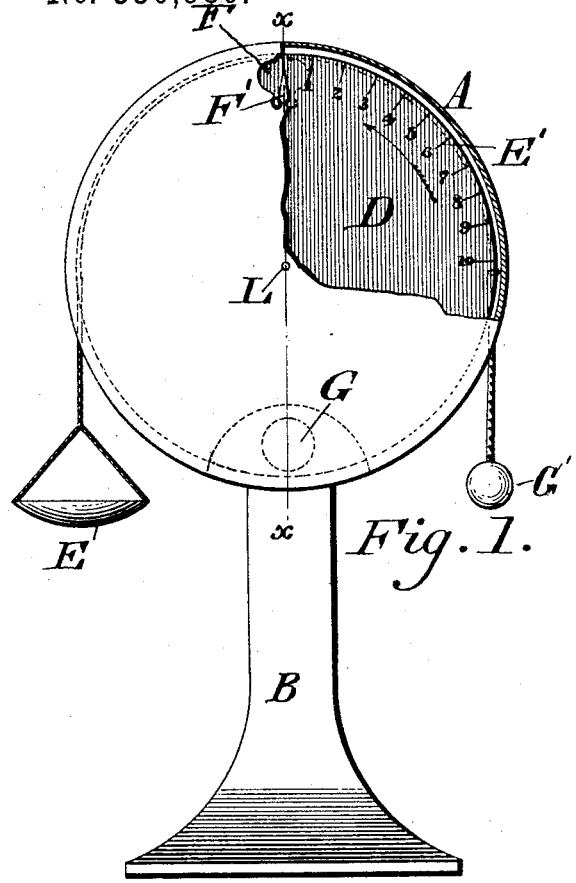
Figure 2:
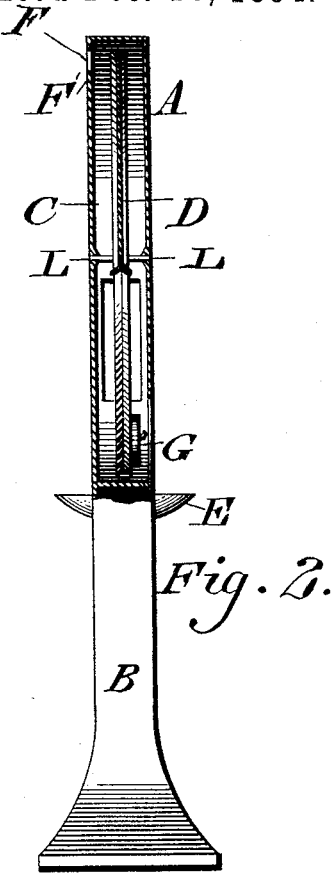
Figure 3:
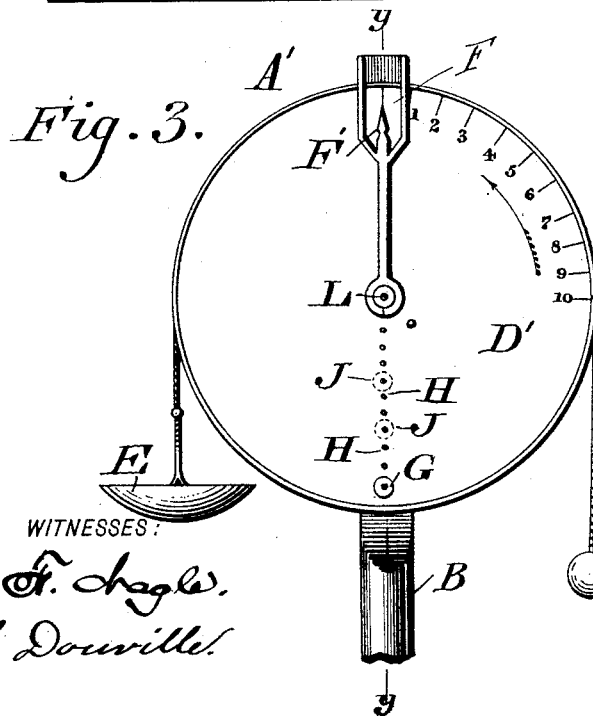
Figure 4:
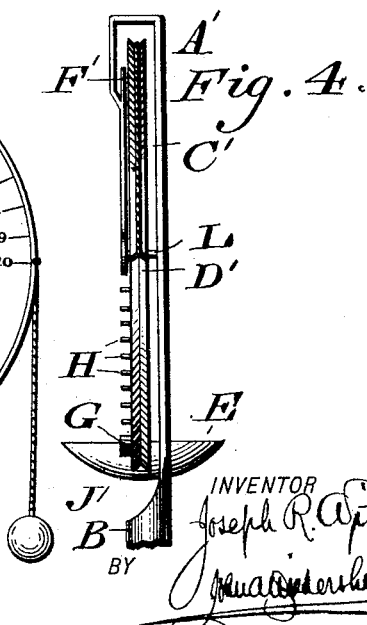
Figure 5:
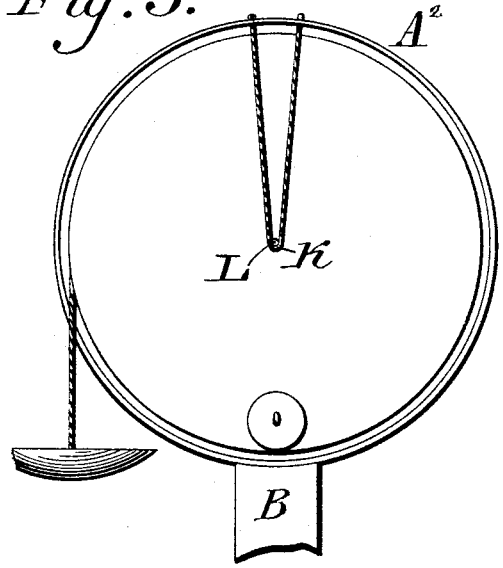
Figure 6:
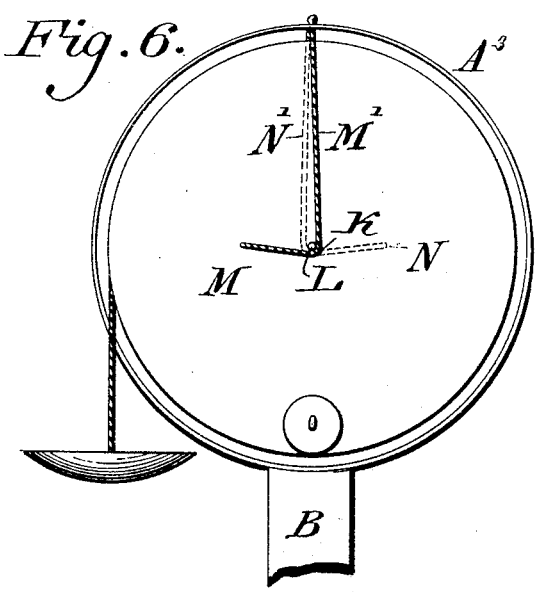

Figure 1 represents a front elevation of a scale. Fig. 2 represents a section on line $x$, $x$, Fig. 1. Fig. 3 represents a front view of a modification. Fig. 4 represents a section on line $y$, $y$, Fig. 3. Figs. 5 and 6 represent front elevations of scales showing different suspension devices therefor.

Similar letters of reference indicate corresponding parts in the several figures.

Referring to the drawings, A designates a frame or casing which rises from the stand B, and formed with a chamber C in which is a rotary disk D, whose axial pin L is mounted on the frame A. Suspended from the periphery of the disk is a weighing pan E, and on the side of the same are graduations E'. Secured to the periphery of the disk on the opposite side thereof from the scale pan, is a weight G' to counterbalance said pan, and on the diametric line of the disk with the zero of the graduation scale is secured a weight to balance the weight of the article placed in the pan.

In the wall of the frame A is an opening F in which is an index finger F', which is adapted to point to any one of the graduations E', for indicating the amount weighed, it being evident that when the article to be weighed is placed in the pan, it turns the disk, and the distance that the latter moves is proportionate to the amount weighed.

In Figs. 3 and 4, the disk D' which is mounted in the supporting frame A' is provided with pins H at varying distances from the center, each of the same being adapted to sustain a weight J, whereby when it is desired to weigh a greater quantity than indicated by the graduations E' a weight is placed on the proper pins and the pan supplied with material until the proper graduation appears at the index, it being noticed that the weight of the article in the scales is determined either by a different graduation scale for each pin, or by a scale marked on said pin in connection with the original graduations.

In order to provide movable bearings for the axis L of the disk, I form flexible bearings K on which said axis is seated. In Fig. 5 both ends of the bearing are secured to the top of the supporting frame.

In Fig. 6 I show the bearings M and N on opposite sides of the disk, the same being connected or formed with arms M', N', which are attached to the top of the supporting frame. These bearings may be formed of steel, brass, copper, platinum or other metal, silk thread, cat gut, &c., thus reducing friction, and obviating the use of knife edges and resulting inaccuracies.

Although I have shown the supporting device for the graduated disk in Figs. 1 and 2 in the form of an inclosing casing, and in Figs. 3 and 4 in the form of a skeleton casing having a back of substantially the same contour as the disk and an overhanging portion which carries the pointer F', and serves also as a support for the axial pin L, I do not wish to be limited to the above features since it is evident that many changes may be made within the scope of my invention, as the front of the casing or supporting frame in Fig. 1, may be partially removed as in Fig. 3, while the frame shown in Fig. 3 may partially inclose the graduated disk if desired, a sufficient opening being left for the manipulation of the weights J, on the pins H.

While I have shown the flexible bearings for supporting the weighing device in separate figures for the convenience of illustration, it will be apparent that the same are capable of general adaptation.

The disk may be of skeleton or segmental form without producing different results.

The feature of the flexible bearings for the axis of the disk forms the subject matter of another application for patent, filed November 24, 1894, Serial No. 529,814.

Having thus described my invention, what

I claim as new, and desire to secure by Letters Patent, is—

1. A pendulum scale, consisting of a disk, suitably supported, and capable of turning freely about an axis, a scale pan depending from said disk, and a counterpoise weight on opposite sides of its periphery, a graduation scale on said disk, a weight secured to the latter on the diametric line of the zero point of the scale, and an index mounted adjacent to the zero mark of the said graduation scale, said parts being combined substantially as described.

2. A pendulum scale, consisting of a standard having a supporting frame thereon, a disk mounted in said frame, a scale pan and a counter-poise weight secured to the opposite sides of the periphery of said disk, a graduation scale on said disk, a weight secured to said disk on the diametric line with the zero point of said graduation scale, an index on said frame at an opening therein opposite the zero point of the graduation scale, pins at proportionate distances on the said diametric line on the disk, and a weight or weights other than the disk or pan counter-poise weight before mentioned, adapted to be secured on any one of said pins, said parts being combined substantially as described.

3. A pendulum scale having a standard with a supporting frame thereon, a disk with journals, and flexible bearings for said journals connected with said frame and opening in opposite directions, said parts being combined substantially as described.

JOSEPH R. WITZEL.

Witnesses:
CHARLES N. KOONS,
FRANCIS W. LEPPING.